United States Patent [19]

Imbert

[11] Patent Number: 4,702,455
[45] Date of Patent: Oct. 27, 1987

[54] TOOLING FOR MANUFACTURING CAGES FOR ROLLER BEARINGS

[75] Inventor: Jean-Paul Imbert, Villefranche-Sur-Saone, France

[73] Assignee: La Bellignite, France

[21] Appl. No.: 925,753

[22] Filed: Oct. 30, 1986

[30] Foreign Application Priority Data

Oct. 31, 1985 [FR] France .................. 85 16216

[51] Int. Cl.$^4$ ............... B29C 39/26; B29C 45/36
[52] U.S. Cl. .................. 249/79; 249/66 R; 249/83; 249/122; 249/142; 425/192 R; 425/554; 425/406; 425/436 R; 425/468
[58] Field of Search ............ 425/116, 117, 123, 127, 425/129 R, 190, 195, 436 R, 438, 444, 554, 556, 406, 468; 264/242, 264, 261; 249/83, 95, 66 R, 142, 63, 64, 67, 79, 122

[56] References Cited

U.S. PATENT DOCUMENTS

| 1,601,378 | 9/1926 | Slade | 164/333 |
|---|---|---|---|
| 2,931,066 | 4/1960 | Goettl | 264/242 |
| 3,435,501 | 4/1969 | Paul | 264/242 |
| 4,278,307 | 7/1981 | Olschewski et al. | 384/526 |
| 4,365,852 | 12/1982 | Fingerle | 384/526 |
| 4,558,961 | 12/1985 | Fernlund | 384/526 |

FOREIGN PATENT DOCUMENTS

| 1135162 | 8/1962 | Fed. Rep. of Germany | 264/242 |
|---|---|---|---|
| 1203447 | 10/1965 | Fed. Rep. of Germany . | |
| 2348043 | 11/1979 | France . | |
| 2515079 | 4/1983 | France . | |

*Primary Examiner*—Willard E. Hoag
*Attorney, Agent, or Firm*—Bell, Seltzer, Park & Gibson

[57] ABSTRACT

The invention relates to the tooling for claw cages for ball bearings comprising a mold proper and an impression unit adapted to be placed inside said mold, said impression unit comprising a crown and a plurality of balls limiting a mold cavity defining a bridge, recesses and claws of such a cage. Said impression unit is produced in several parts adapted to be made fast to one another, shaped to provide a multiplicity of recesses each having substantially the shape of a portion of a spherical cap, so that when said parts are assembled said recesses provide a multiplicity of substantially spherical housings in each of which a ball is received held in a pre-established position determining with accuracy a hollow and claws of said mold cavity. The invention is useful for the manufacture of ball bearings.

5 Claims, 5 Drawing Figures

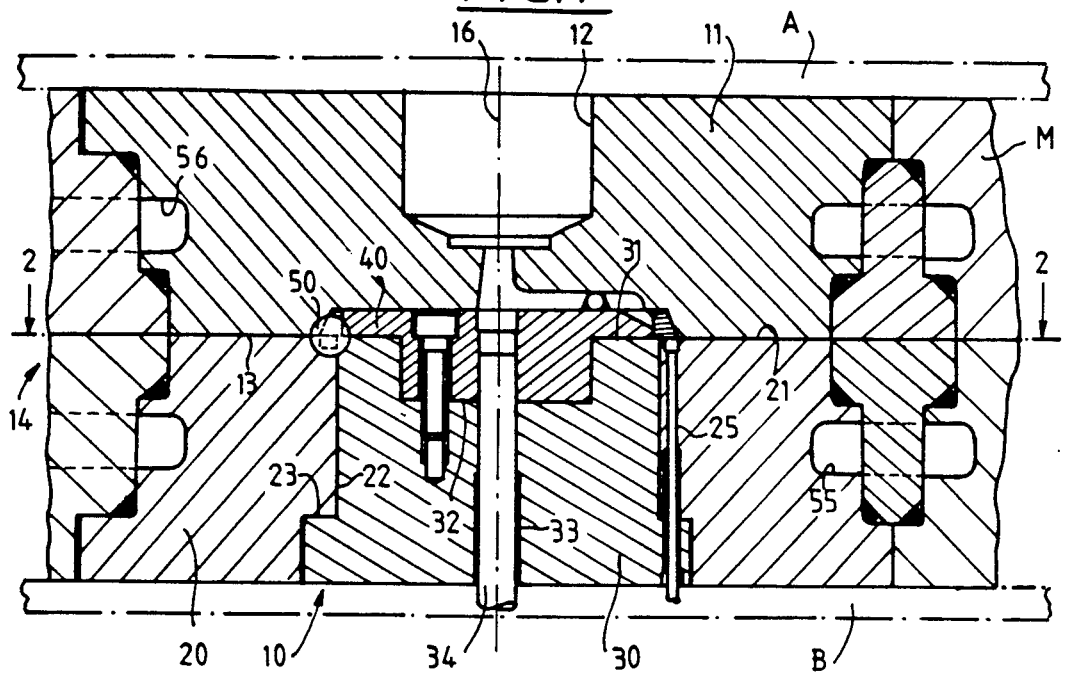
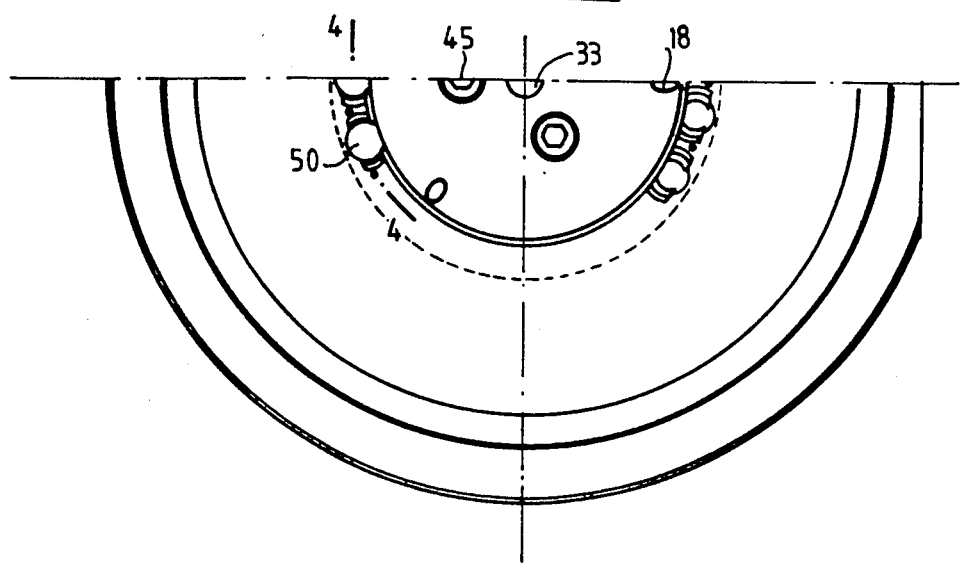

TOOLING FOR MANUFACTURING CAGES FOR ROLLER BEARINGS

The invention relates to tooling for manufacturing cages for roller bearings.

It is aimed, in particular, at tooling for the manufacture of what has become known as claw cages, that is to say cages in which balls are housed in part and which, in ball bearings, define and ensure the relative positioning of the balls with respect to one another, in particular the regular spacing of the various bearing elements.

Although cages for ball bearings have been manufactured initially of metal, for many years there have been known, for example, through FR-A-993 520, FR-A-1 104 502 or FR-A-1 104 870, claw cages of thermoplastics material produced by injection, for example filled or unfilled polyamides. Such cages are generally manufactured by means of a method according to which a mold is constructed of which the impression unit is formed, in part, by the balls of the claw cage that the mold is intended to manufacture, said balls being machined to fix them on a crown where they are held by screws which cooperate with blind bores which they possess.

The production of such a mold is relatively complex, long and costly, so that its manufacture is only envisaged for the production of long series of cages of a same bearing model.

Now if there exists a demand for small or average series of such claw cages, differing between themselves in their shape and/or their dimensions, it has not been possible, hitherto, to satisfy this requirement and that by reason of the difficulties associated with the high cost of producing mold impression units used for the manufacture of such claw cages.

It is a particular object of the present invention to provide a method and a tooling for manufacturing cages for ball bearings of injected plastics material which permit the above-mentioned drawbacks of cost and speed of manufacture to be overcome.

It is another object of the invention to provide a method of manufacturing cages for ball bearings and tooling for putting it into practice whose exploitation can be conducted in present molding installations for thermoplastics materials particularly by means of existing known injection presses.

It is another object of the invention to provide a manufacturing method for cages for ball bearings and a tooling for putting it into practice which permit the production of claw cages of very diverse types and sizes thus enabling the multiple desiderata of practice to be met.

It is lastly, an object of the invention to provide such a method and tooling for its practice which, complementarily, enable a manufacture which is more rational and under better conditions of efficiency than those hitherto possible, particularly through better mastery than in the past of the thermal phenomenon of molding and of unmolding.

A manufacturing tooling for claw cages for ball bearings according to the invention, comprising a mold proper and an impression unit adapted to be placed within said mold, said impression unit comprising a crown and a plurality of balls bounding a mold cavity defining a bridge, recesses and claws of such a cage, is characterized in that said impression unit is formed in several parts adapted to be made fast to one another, shaped to provide a multiple recess each having substantially the shape of a portion of a spherical cap, so that when said parts are assembled said recesses provide a multiplicity of substantially spherical housings in each of which is received a ball held in a pre-established position determining with accuracy a socket and claws of said mold cavity.

In an advantageous embodiment, the impression unit is produced in four parts certain of which comprise not only the constituent recesses of the ball-receiving housings but also injection channel means, means for the passage of the demolding members, etc.

In a preferred embodiment, a first part of the impression unit is adapted to be made fast, through a mold, with the fixed plate of a thermoplastics material injection machine; a second part is adapted to be made fast, through the mold, with a moveable plate of said injection machine; a third part, or core, designed to line an axial chimney of the second part is shaped in the vicinity of the plane of the joint as a recess and a fourth part, or core cover, is adapted to cooperate with said recess on the one hand, and with a cavity formed in the vicinity of the joint plane of said first part, on the other hand, assembly screw means being provided between said third and fourth part.

In manner known in itself, the core is pierced by an axial bore for the passage of a core extractor and said second part is pierced by longitudinal bores for the passage of extractors.

To reduce the manufacturing cycle, said first and second parts are provided, on their outer cylindrical periphery, with grooves for the flow of cooling fluid.

The invention is also directed at a method for the manufacture of cages for ball bearings, by the injection of thermoplastics material reinforced or unreinforced in a mold provided with an impression unit defining a mold cavity, characterized in that there is first produced, by known techniques of machining metals, different parts of the impression unit shaped to provide a multiplicity of recesses each having substantially the shape of a portion of a spherical cap, wherein the first and second parts of the impression unit are assembled to form substantially hemispherical housings, balls are placed in position in said housings, the other constituent parts of the impression are assembled, said parts are made fast to one another, the impression unit is placed in the mold designed to receive it, the injection of the thermoplastics material, filled or unfilled, is effected, and the unmolding and the extraction of the balls from the claws which enclose them is effected by taking advantage of the elasticity of the constituent plastics material of the cage.

Such a method enables considerable simplification and, thereby, reduction of manufacturing costs of an impression unit, particularly taking into account possibilities offered by modern mechanical machining techniques such as those of electro-erosion, electro-forming, and techniques of the computerized type or the like.

The invention will be better understood through the description which follows, given by way of example and with reference to the accompanying drawing in which:

FIG. 1 is a view in section of an apparatus according to the invention;

FIG. 2 is a half-view from above of a part of an apparatus according to the invention, along the arrows 2—2 of FIG. 1;

Figure 3:
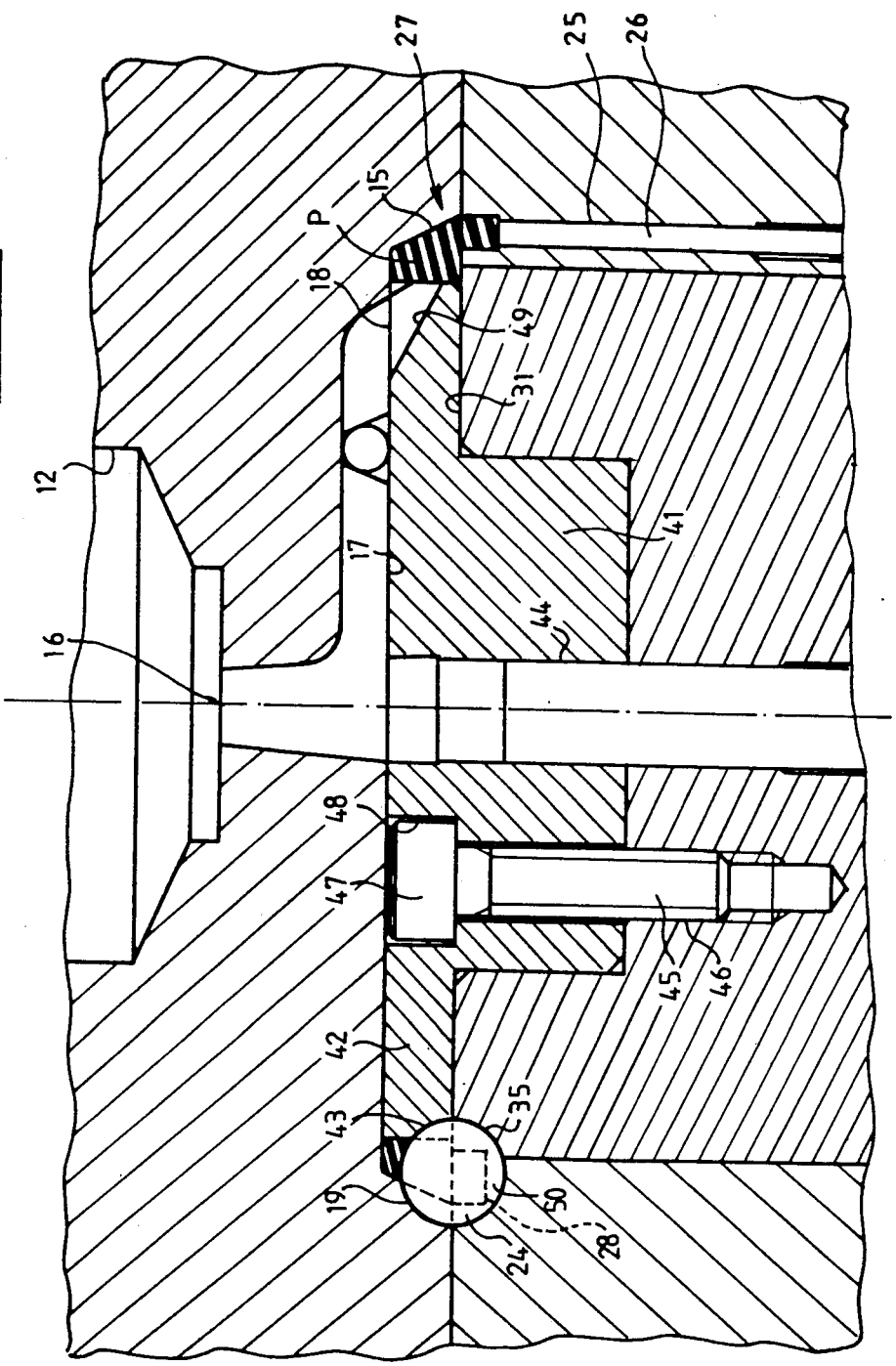
FIG. 3 is a view in partial section similar to FIG. 1, but on a larger scale.

Reference will first be made to FIGS. 1 to 3 which show a tooling according to the invention for the manufacture of claw cages for ball bearings of injected thermoplastics material, for example, of filled or unfilled polyamide.

Such tooling, designed to equip the mold M, known in itself, of a thermoplastics material injection machine with a fixed plate A and a moveable plate B, comprises essentially an impression unit 10 which, according to the invention, defines a mold cavity for receiving the injected thermoplastics material by assembly with one another of four separate parts and balls.

More precisely, the impression unit 10 comprises a first part 11 of generally cylindrical shape, adapted to be made fast through the mold M with the fixed plate A, pierced along its axis 16 by a bore 12 for the injection of the thermoplastics material and of which the surface 13, opposite that for fixation to the mold M and to the plate A, forms one of the surfaces of the joint plane 14. In the vicinity of the latter, and as is easily seen in FIG. 3, the part 11 has a cavity 27, limited by a surface 15, a surface 17 pierced by one or preferably several orifices 18 for the passage of the injected material and the joint surface 13.

In addition, and according to the invention, said part 11 is shaped in the vicinity of the joint plane into a multiplicity of recesses 19 in the form of spherical cap portions, distributed regularly from the angular point of view around the axis 16 which is also that of the claw cage during its manufacture.

A second part of the impression unit 10 is constituted by a part 20 designed to be fixed through the mold M on the moveable plate B of the injection machine and which is of the same general cylindrical shape as that of the part 11 to which it can be coupled through its surface 21 defining the joint plane 14. In said part 20 is formed an axial chimney 22 which terminates opposite the joint plane through a shoulder 23 and which, in the vicinity of its opening on the surface 21, has recesses 24 with the same regular angular distribution as the recesses of 19 of the part 11, themselves also in the form of spherical cap portions. In these recesses 24 are in addition formed recesses 28 themselves also as a spherical cap portion intended to provide the mold cavities for the claws. As seen in FIGS. 1 and 3 the part 20 is complementarily pierced by longitudinal channels 25, distributed regularly around the axis 16 for the passage of ejectors 26 whose role will be specified below.

Chimney 22 with a shoulder 23 is provided to receive a core 30 which constitutes a third part of the impression unit. This core, of which the lower surface rests on the plate B and of which the upper surface 31 is in the joint plane 14, is pierced by an axial channel 33 for the passage of a core extractor 34, shows at its upper part a recess 32 and is shaped at the periphery of its flat annular surface 31 along a multiplicity of recesses 35 in the shape of spherical cap portions, angularly equidistant and positioned in correspondance with the recesses 19 and 24 of the parts 11 and 20. In certain embodiments, corresponding to particular types of cages, the recesses 35 have cavities similar to those referenced at 28 above and which contribute to defining the mold cavities of the claws.

The impression unit 10 also comprises a part 40, or core cover with tubular cylindrical body 41 adapted to cooperate with the recess 32 of the part 30 and with a cover 42 of shape conjugate with that of the cavity 27 of the part 11 to provide in the mold cavity the constituent space for the bridge P of the bearing cage, FIG. 3. Similarly to the parts 10, 20 and 30, the part 40 is shaped at the outer periphery of the base of the cap 42 into recesses 43 in the shape of spherical cap portions and whose angular arrangement, number and consequently pitch are identical with those of the recesses 19, 24 and 35 of the other parts of the impression unit.

Part 40 is in addition pierced by channel 44 extending the channel 33 of the part 30 when said parts are joined to one another by screws 45 whose shanks cooperate with tapped blind holes 46 of the part 30 and of which the heads are housed in hollows 48 of the cover 42. The latter is pierced by oblique holes 49, which come to face holes 18 of the part 11 when the impression unit is assembled, and which serve for the passage of the injected thermoplastics material.

For the assembly of the impression unit, the core 30 is first placed in position in the part 20 until the abutment of a shoulder of said core against the shoulder 23; there are then placed, in the hemispherical recesses formed by the spherical cap portions 24 and 35, balls 50 of a diameter corresponding to that of said recesses, the part 40 of the core cover is applied onto the parts 20 and 30 and onto the balls 50 and the screws 45 are placed in position; when the part 11 of the impression unit is applied onto this assembly, the tooling is ready for use.

Figure 4:
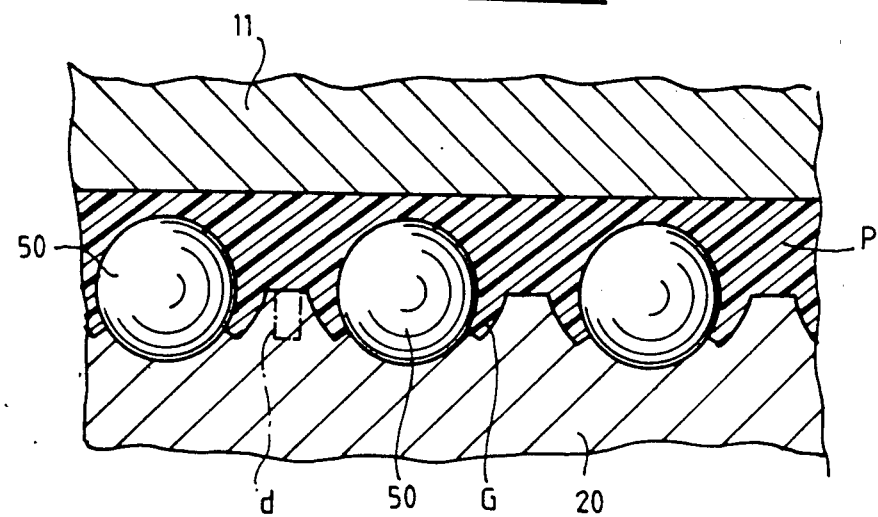
FIG. 4 is a partial developed view, along the line 4—4 of FIG. 2, on a larger scale.

The injection of thermoplastics material, performed in the usual manner, then provides a cage C with a bridge P and claws G, FIG. 4, which is extracted from the mold after the moveable plate B has been spaced from the fixed plate A of the injection machine by using the elasticity of the constituent material of the cage, the injectors 26 contributing to the extraction of the part from the mold.

Figure 5:
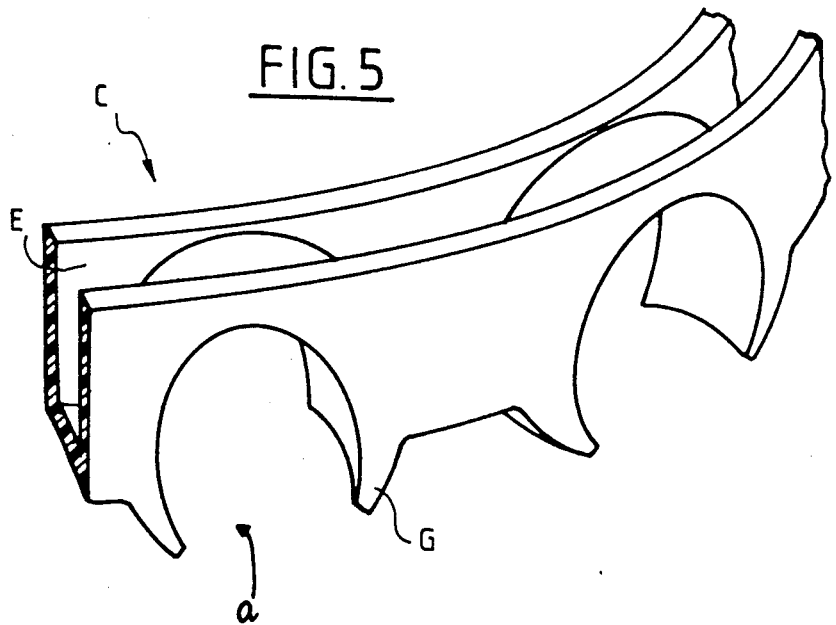
FIG. 5 is a diagrammatic view, in perspective, of a claw cage for ball bearings, such as obtained by means of a method and tooling according to the invention.

The method and tooling according to the invention enable the fabrication of claw cages for ball bearings of the most varied shapes and sizes, for example, with locating elements d (FIG. 4) for the automatic positioning of the balls or of the type shown in FIG. 5 which illustrates a cage portion whose bridge E is recessed for considerations of lightness and whose claws G are arranged on each side of the housing recesses A for the balls (not shown).

The possibility of machining separately and with great accuracy each of the constituent parts of the impression unit particularly by modern techniques of electro-erosion, of electro-forming associated or not with computerized techniques, enables the production simply and positively of housings for the maintenance in position of the balls 50 in the impression unit, with the consequence of a cage manufacture as accurate but more rapid than by the techniques of the prior art.

To the rapidity of fabrication contributes also the fact that the parts 11 and 20 of the impression unit being produced as solid parts, they can easily be machined over their periphery to arrange grooves like 55 and 56, FIG. 1, for the flow of cooling fluid enabling the manufacturing cycle to be reduced and for this reason, production rates to be increased.

I claim:

1. Tooling for the manufacture of claw cages for roller bearings comprising a mold proper and an impression unit adapted to be placed inside said mold, said impression unit comprising a crown and a plurality of balls limiting a mold cavity defining a bridge, recesses and claws of such a cage, wherein said impression member is constructed in several parts adapted to be made fast to one another, shaped to provide a multiplicity of recesses each having substantially the shape of a spherical cap portion, so that when said parts are assembled said recesses provide a multiplicity of substantially spherical housings in each of which is received a ball held in a pre-established position determining with accuracy a recess and claws of said mold cavity.

2. Tooling according to claim 1, wherein the impression unit comprises:
    a first part adapted to be made fast through a mold with the fixed plate of a thermoplastic material injection machine;
    a second part adapted to be made fast by the mold with the moveable plate of said injection machine;
    a third part, or core, designed to line an axial chimney of said second part and which is shaped in the vicinity of the joint plane to define a recess;
    a fourth part, or core cover, adapted to cooperate with said recess on the one hand and with a cavity formed in the vicinity of the joint plane of said first part, on the other hand; and
    screw means for assembly between said third and fourth parts.

3. Tooling according to claim 2 wherein the claws of the mold cavity are provided by recesses in the form of portions of a spherical cap provided in the recesses of said second part.

4. Tooling according to claim 1 or claim 2, wherein, in known manner, the claw is pierced by an axial bore for the passage of a core remover and wherein said second part is pierced by longitudinal bores for the passage of extractors.

5. Tooling according to claim 1, wherein said first and second part are provided on their outer cylindrical periphery, with grooves for the flow of a cooling fluid.

* * * * *